(12) United States Patent  
Gibson et al.

(10) Patent No.: US 11,964,413 B2  
(45) Date of Patent: Apr. 23, 2024

(54) WOOD HANDLE WITH OVERMOLD AND METHOD OF MANUFACTURE

(71) Applicant: The Ames Companies, Inc., Camp Hill, PA (US)

(72) Inventors: Royden H. Gibson, Dexter, MO (US); Marcus E. Norden, Bernie, MO (US); Sam D. Hector, Dexter, MO (US); Jim H. Bennett, Dexter, MO (US); Carl R. Walker, Bernie, MO (US)

(73) Assignee: The Ames Companies, Inc., Camp Hill, PA (US)

( * ) Notice: Subject to any disclaimer, the term of this patent is extended or adjusted under 35 U.S.C. 154(b) by 330 days.

(21) Appl. No.: 17/201,144

(22) Filed: Mar. 15, 2021

(65) Prior Publication Data

US 2021/0197431 A1 Jul. 1, 2021

Related U.S. Application Data

(62) Division of application No. 13/005,577, filed on Jan. 13, 2011, now Pat. No. 10,974,423.

(51) Int. Cl.
| | |
|---|---|
| B29C 45/14 | (2006.01) |
| B25D 1/00 | (2006.01) |
| B25G 1/10 | (2006.01) |
| B29K 711/14 | (2006.01) |

(52) U.S. Cl.
CPC .......... B29C 45/14549 (2013.01); B25D 1/00 (2013.01); B25G 1/10 (2013.01); *B29K 2711/14* (2013.01); *Y10T 29/49938* (2015.01)

(58) Field of Classification Search
CPC . B29C 45/14549; B29C 45/14; B29C 35/046; B29K 2711/14
USPC ......................................................... 264/478
See application file for complete search history.

(56) References Cited

U.S. PATENT DOCUMENTS

| | | |
|---|---|---|
| X96061 | 10/1869 | Warner |
| X479032 | 7/1892 | Surbaugh |
| X978510 | 12/1910 | Taylor |
| 1,401,896 A | 12/1921 | Ehrhart |
| 1,581,647 A | 4/1926 | Layton |
| 1,998,356 A | 4/1935 | Brown |
| 2,603,260 A | 7/1952 | Floren |
| 2,960,133 A | 11/1960 | Shepherd, Jr. |
| 3,115,912 A | 12/1963 | Harris |
| 3,320,985 A | 5/1967 | Maguire et al. |
| 3,576,049 A | 4/1971 | Williams |
| 3,682,516 A | 8/1972 | Savage |
| 3,712,659 A | 1/1973 | Kneissl |
| 3,762,453 A | 10/1973 | Merrow et al. |
| 3,770,033 A | 11/1973 | Gavillet et al. |
| 3,991,146 A | 11/1976 | Barrie |
| 4,165,875 A | 8/1979 | Dykehouse |
| 4,241,115 A | 12/1980 | Temin |
| 4,287,640 A | 9/1981 | Keathley |
| 4,344,901 A | 8/1982 | Keathley |

(Continued)

FOREIGN PATENT DOCUMENTS

CN 101003169 A 7/2007

*Primary Examiner* — Jeffrey M Wollschlager  
*Assistant Examiner* — Xue H Liu  
(74) *Attorney, Agent, or Firm* — Brooks Kushman P.C.

(57) ABSTRACT

The disclosed and claimed concept provides for an overmold that is applied to substantially all of the exposed portions of a wood handle for a tool.

19 Claims, 4 Drawing Sheets

(56) References Cited

U.S. PATENT DOCUMENTS

| | | | |
|---|---|---|---|
| 4,723,582 | A | 2/1988 | Caspall |
| 4,738,166 | A | 4/1988 | Yamaguchi |
| 5,141,353 | A | 8/1992 | Meredith et al. |
| 5,653,643 | A | 8/1997 | Falone et al. |
| 5,871,204 | A | 2/1999 | Spirer |
| 6,009,600 | A | 1/2000 | Egeland et al. |
| 6,202,511 | B1 | 3/2001 | Murray et al. |
| 6,311,369 | B1 | 11/2001 | Ryu |
| 6,463,629 | B1 | 10/2002 | Niccolai |
| 6,511,386 | B1 | 1/2003 | Cacicedo |
| 7,320,266 | B1 | 1/2008 | Mueller |
| 7,467,572 | B2 | 12/2008 | Fisher et al. |
| 9,168,648 | B2 | 10/2015 | Lombardi |
| 2003/0029278 | A1 | 2/2003 | Macioce et al. |
| 2003/0118810 | A1* | 6/2003 | Grantham ............... C08L 97/02 428/323 |
| 2005/0178243 | A1 | 8/2005 | Schoor |
| 2005/0193876 | A1 | 9/2005 | Broyles |
| 2008/0053278 | A1 | 3/2008 | St. John et al. |
| 2008/0245805 | A1 | 10/2008 | Ferron |
| 2016/0008966 | A1 | 1/2016 | Stokes et al. |

\* cited by examiner

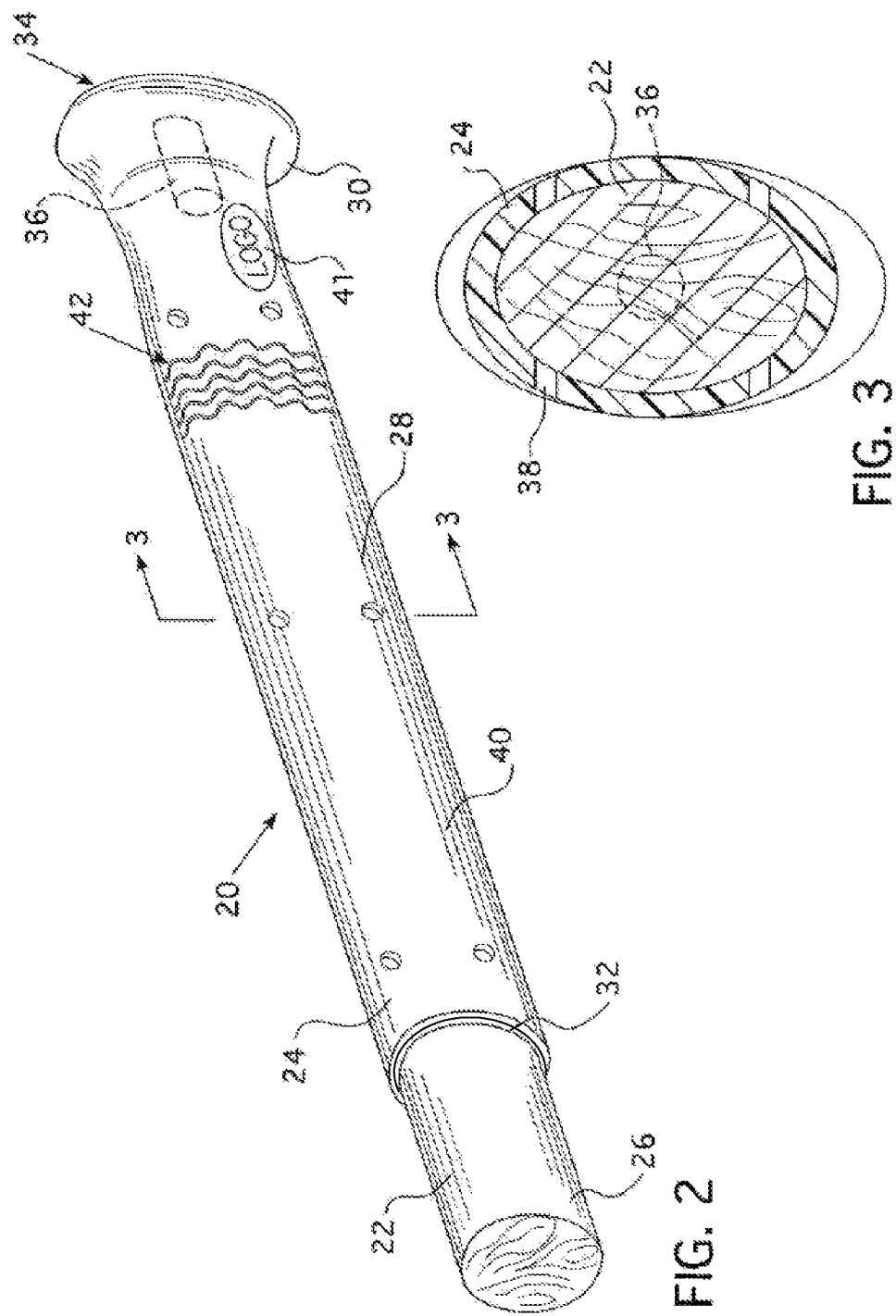

11,964,413 B2

WOOD HANDLE WITH OVERMOLD AND METHOD OF MANUFACTURE

CROSS-REFERENCE TO RELATED APPLICATIONS

This application is a division of U.S. application Ser. No. 13/005,577 filed Jan. 13, 2011, now U.S. Pat. No. 10,974,423 B2, the disclosure of which is hereby incorporated in its entirety by reference herein.

BACKGROUND OF THE INVENTION

Field of the Invention

The disclosed concept relates to a wood tool handle having an overmold and, more specifically, to a wood handle wherein substantially all of the handle surface is protected by the overmold.

Background Information

Tools, and more specifically tool handles, are made from different materials having different advantages and disadvantages. For example, wood, and especially hickory wood, is known to be lightweight, impact absorbent, inexpensive, and strong. Hickory wood, however, is subject to degradation from exposure to the elements. Fiberglass handles, on the other hand, are less effected by exposure to the elements, but may be heavy and less impact resistant. Metal handles are strong and lightweight, but are expensive and do not absorb impact shocks.

One method of improving handles is to apply a protective coating over the handle member. Wood handles often have a coating of varnish or a similar material that provides some protection form the elements. Metal and fiberglass handles may have a plastic coating or a preformed sheath disposed thereon. Such plastic is often an injection molded plastic. Injection molded plastics are strong and may help dampen the shock of impact. However, given that wood handles must retain some moisture so as to retain their resilience, and as applying injection molded plastic requires heating the plastic to the point where applying the molten plastic causes water within a wood handle to be converted to steam, there has not been a method to apply a plastic overmold to substantially all of a wood handle.

As set forth in U.S. Pat. Nos. 4,287,640 and 4,344,901, it is known to apply an overmold to a portion of a wood handle. As noted in those patents, the portion of the handle to have an overmold applied thereto is subjected to additional drying. That is, the portion of the handle that is supported by the overmold is dried more than the unsupported portions of the handle. Thus, the unsupported portion of the handle retains its resilience while the protected portion is supported by the overmold.

SUMMARY OF THE INVENTION

The disclosed and claimed concept provides for an overmold that is applied to substantially all of the exposed portions of a wood handle. That is, the handle is an elongated wood member having a first end, a medial portion, and a second end. The first end is sized and shaped to fit within the eye of a tool head. The second end has a bore hole. The medial portion and the second end, except for the bore hole, are enclosed in the injection molded overmold. Thus, when the handle member first end is enclosed by the tool head eye, the tool handle is substantially protected from the elements and other forms of wear and tear. That is, the handle member first end is protected by the tool head and the overmold is applied to substantially all of the handle member medial portion and second end.

During manufacture a wood handle member, such as but not limited to a hickory handle member, is typically kiln dried until the moisture content is between about 12% and 18%. With this moisture content, the handle member retains a sufficient resilience for use as a handle member on an impact tool, such as, but not limited to, a sledge hammer. Per the disclosed method, the entire handle is further air dried until the moisture content is below 10%. The handle member is then placed in a mold. The mold is structured so that the handle member first end and at least the bore hole on the second end will not be exposed to the molten material being applied to the handle member. Thus, when the mold is filled with molten plastic, and more preferably molten polypropylene, the handle member first end and at least the bore hole on the second end are not enclosed and are free to vent steam. That is, application of the molten plastic causes water within the handle to be converted to steam; this steam must exit the handle without passing through the molten plastic. By having the first end and the bore hole exposed, the steam is free to pass through these locations and does not disturb the molten plastic.

BRIEF DESCRIPTION OF THE DRAWINGS

A full understanding of the invention can be gained from the following description of the preferred embodiments when read in conjunction with the accompanying drawings in which:

FIG. 2 is an isometric view of a tool handle assembly;

FIG. 3 is a cross-sectional view of the tool handle assembly;

DESCRIPTION OF THE PREFERRED EMBODIMENTS

As used herein, an "overmold" is a layer of material applied to a substrate by injection molding.

As used herein, "generally uniform" and/or "generally smooth" when used in reference to the overmold outer surface means that the outer surface does not include any significant deformations in the overmold outer surface. Examples of insignificant deformations include, but are not limited to, a pattern of uniform ridges and valleys structured to act as a gripping surface, a decoration, logo, or trademark formed in a discrete location, or a window formed in a discrete location and structured to show the substrate. Such insignificant deformations are intentional and are typically incorporated into the mold. Alternatively, such intentional and/or insignificant deformations may be carved or cut into the overmold after application to the wood member.

As used herein, "substantially smooth" when used in reference to the overmold outer surface means that the outer surface does not include any decorative deformations or breaks in the overmold outer surface. There may, however, be a limited number of small openings such as those structured to assist in the venting of steam from the handle during application of the overmold. A "limited number" is about 12 and "small openings" are between about ⅛ and ⅜ inch in diameter and more preferably about ¼ inch in diameter.

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

Figure 1:
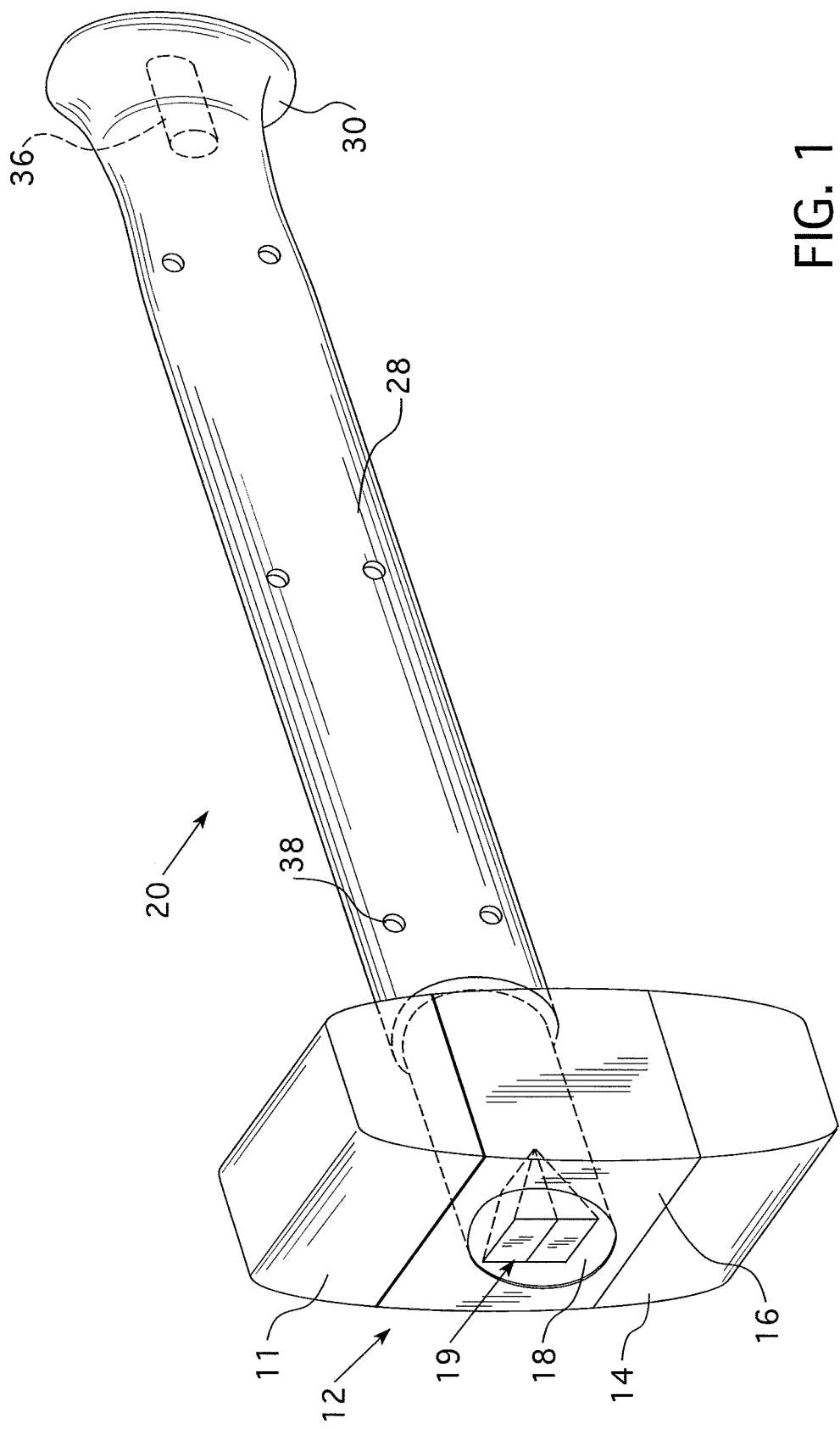
FIG. 1 is an isometric view of a tool.

As shown in FIG. 1, a tool 10 includes a tool head assembly 12 and a tool handle assembly 20. The tool 10 may be any type of tool 10, such as, but not limited to, a sledge hammer 11 as shown. The tool head assembly 12 includes a tool head 14 and a coupling device 16. The tool head 14 is typically made from metal and includes an opening, more commonly identified as the eye 18. The eye 18 extends through the tool head 14 and is structured to have a portion of a tool handle assembly 20 disposed therein. The coupling device 16 is preferably a mechanical coupling device such as, but not limited to one or more wedges 19.

The tool handle assembly 20 includes a wood member 22 and an overmold 24. The wood member 22, which may be, but is not limited to, hickory wood, is elongated and includes a first end 26, a medial portion 28 and a second end 30. The handle member first end 26 is sized and shaped to correspond to the size and shape of the tool head eye 18. That is, the handle member first end 26 is sized and shaped to fit snuggly within the tool head eye 18. The handle member first end 26 may have a cross-sectional area that is smaller than the handle member medial portion 28 immediately adjacent the handle member first end 26. Preferably, the transition between the handle member first end 26 and the handle member medial portion 28 is a flange 32 that extends generally perpendicular to the longitudinal axis of the wood member 22.

The handle member medial portion 28 includes the portion of the wood member 22 below (as shown in the figures) the flange 32 to the handle member second end 30. The handle member second end 30 includes an end face 34. The second end face 34 is preferably generally perpendicular to the longitudinal axis of the wood member 22, however, it is also known for the second end face 34 to be cut at an angle relative to the longitudinal axis of the wood member 22. As used herein, a "generally perpendicular" end face shall include an angled second end face 34. A bore hole 36 in the second end face 34 extends generally parallel to the longitudinal axis of the wood member 22.

The wood member 22 preferably has a length between about 31.75 and 32.25 inches, and more preferably 32.0 inches. The wood member 22 preferably has a cross-sectional area between about 0.75 sq. in. and 0.85 sq. in., and more preferably 0.80 sq. in. The cross-sectional area, which is typically generally oval in shape, may vary over the length of the wood member 22. Typically, the wood member 22 has a greater cross-sectional area at, or near, either/both the first end 26 and the second end 30. The bore hole 36 has a depth between about 1⅜" and 1⅝", and more preferably 1½". The bore hole 36 preferably has a cross-sectional area between about 0.1725 sq. in. and 0.2217 sq. in., and more preferably 0.196 sq. in.

The overmold 24 is preferably made from polypropylene. The overmold 24 is applied as a molten material that is injected into a mold, as described below. The overmold 24 is applied to substantially all of the handle member medial portion 28 and the handle member second end 30. The overmold 24 does not cover the handle member first end 26 or the bore hole 36 during application; as discussed below, a hollow tube 62 is inserted into the bore hole 26 to allow for venting steam. After application of the overmold 24 and removal of the hollow tube 62, the overmold 24 material may swell into the bore hole 26. It is noted that the overmold 24 may cover a portion, or all, of the second end face 34 other than the bore hole 26 as described above. The overmold 24 has a thickness, when dry, of between about 0.1 inch and 0.2 inch, and more preferably 0.125 inch. The thickness may vary over the length of the handle and/or on different sides of the handle. Further, it is more preferable that the overmold 24 has a thickness of no less than 0.1 inch. It is noted that the thickness of the overmold 24, as well as the temperature of the overmold 24 in the molten state, effect the amount of heat transferred to the wood member 22 during application of the overmold 24. That is, the thicker/hotter the molten material applied to the wood member 22, the greater the amount of heat added to the wood member 22. The more heat that is added to the wood member 22, the more moisture in the wood member 22 is converted to steam.

Figure 4:
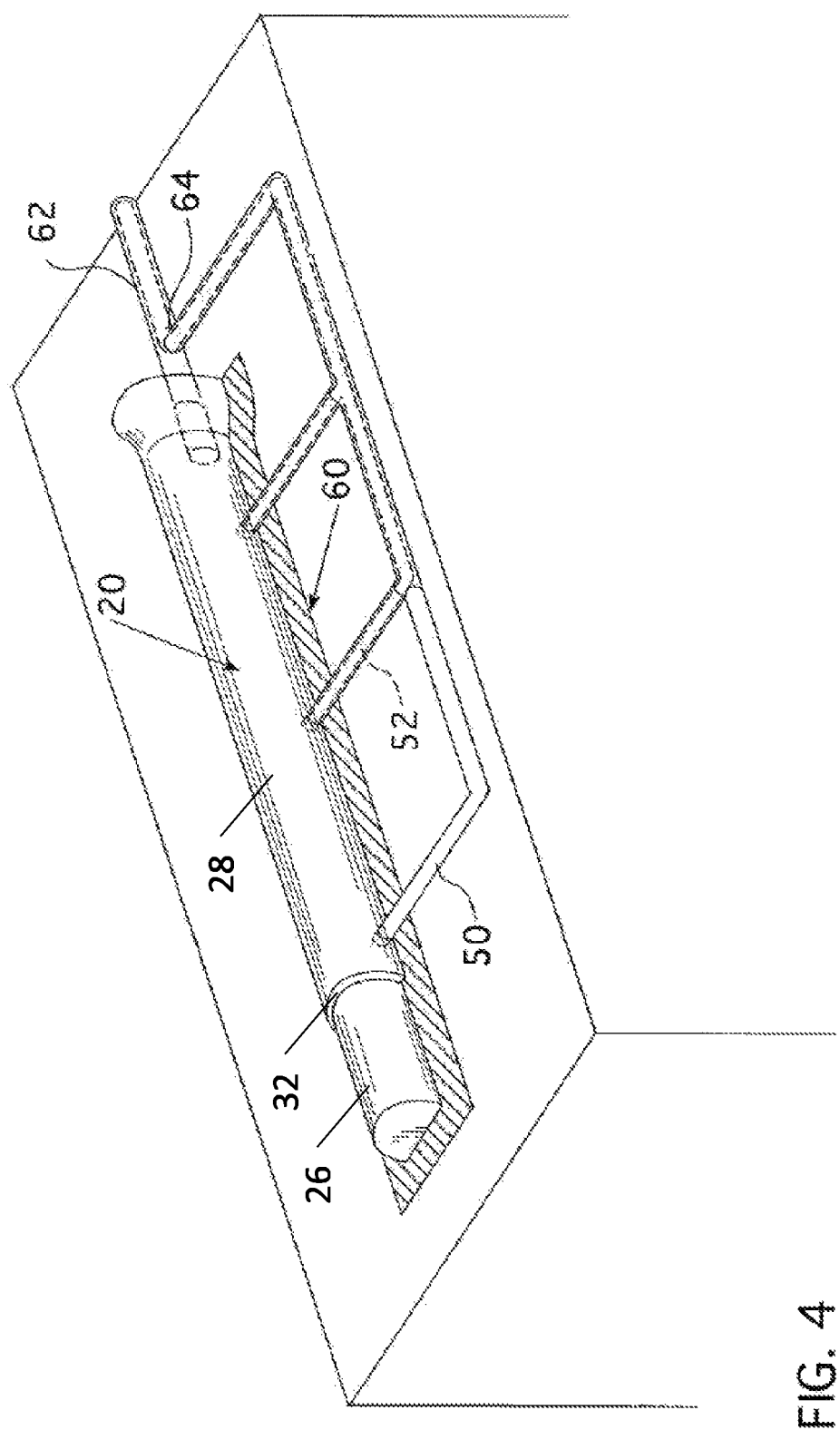
FIG. 4 is an isometric view of a wooden handle in a mold.
Figure 5:
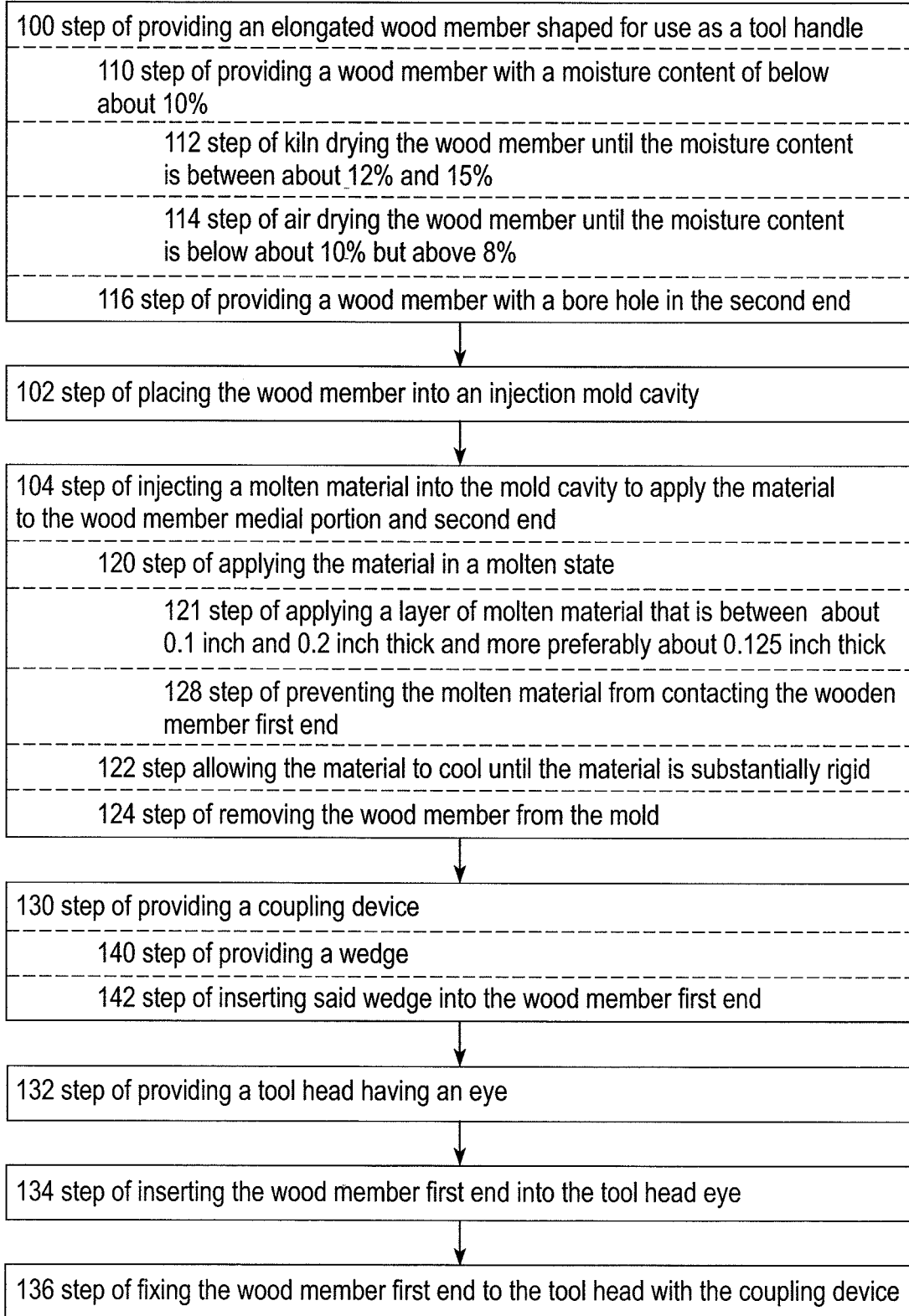
FIG. 5 is a flow chart of the disclosed method.

The overmold 24 has an outer surface 40 that may be either generally uniform, generally smooth, or substantially smooth. A generally uniform outer surface on an overmold 24 may include ridges/valleys 42 formed, or cut, into the overmold 24. The valleys 42 do not extend to the surface of the wood member 22. The ridges/valleys 42 are structured to improve the grip of a user. A generally smooth overmold outer surface 40 extends generally parallel to the outer surface of the underlying wood member 22 and is generally free from deformations. As defined above, a generally smooth overmold outer surface 40 may include an intentional "deformation" 41 in the overmold outer surface 40 at a discrete location, e.g. a logo or a window formed in the overmold 22. A substantially smooth overmold outer surface 40 is substantially free of any decorative deformations in the overmold outer surface 40. That is, the overmold outer surface 40 extends substantially parallel to the outer surface of the underlying wood member 22 and is substantially free from deformations. A substantially smooth overmold outer surface 40 may still have a limited number of openings 38 therethrough. As described below, the wood member 22 may be supported by a limited number of pins 50 and more preferably vent pins 52, while in the injection mold cavity 60 (FIG. 4). The vent pins 52 are hollow and are structured to allow steam to pass therethrough. The vent pins 52 contact the wood member 22 and, as such, during application of the overmold 24, the overmold 24 material forms vent openings 56 about the locations of the vent pins 52. As with the bore hole 36, the overmold may expand into the vent openings 56 while cooling.

When assembled, the tool 10 has the wood member first end 26 disposed in the tool head eye 18. The coupling device 16, which is preferably a wedge 19, is inserted into the axial face of the wood member first end 26. This causes the material that forms the wood member first end 26 to be deformed laterally thereby creating a mechanical lock between the tool head 14 and the wood member 22. In this configuration, the overmold 24 covers the wood member medial portion 28 and second end 30, and may cover substantially all of the second end face 34 except for the bore hole 36. Further, the tool head 14 covers most of the wood member first end 26. Thus, substantially all of the wood member 22 is enclosed and protected within the overmold 24 and tool head 14.

The method of creating the tool handle assembly 20 includes the following steps. Providing 100 an elongated wood member 22 shaped for use as a tool handle, the wood member 22 having a first end 26, a medial portion 28 and a second end 30; placing 102 the wood member 22 into an injection mold cavity 60 (partially shown in FIG. 4, it is understood that the mold has an upper half, not shown, that is similar to the lower half; when the molds are joined a cavity is formed about the wood member 22); and injecting 104 a molten material into the mold cavity to apply the material to the wood member medial portion 28 and second end 30. It is noted that the mold cavity 60 is slightly greater in cross-sectional area than the wood member 22. That is, the mold cavity 60 allows for an overmold 24 having a dry/cool thickness of between about 0.1 inch and 0.2 inch, but preferably not less than 0.1 inch in thickness. The size of the mold 60 cavity may vary depending upon the properties of the material between the liquid/hot application and the cool/dry resulting overmold 24, however, as discussed below, the molten material typically is between about 0.1 inch and 0.2 inch thick, and more preferably about 0.125 inch thick. The wood member 22 is, preferably, held by first end 26 during application of the overmold material. It is noted, the bore hole 36 may have a hollow tube 62 inserted therein for support. That is, the hollow tube 62 extends from the inner surface of the mold 60 and is structured to be snugly inserted into the bore hole 36. The hollow tube 62 has a large enough cross-sectional area so that molten material cannot move past the hollow tube 62 and into the bore hole 36. The hollow tube 62 is in fluid communication with at least one passage 64 through the mold 60, whereby steam may be vented. Further, the wood member medial portion 28 may also be supported by a limited number of pins 50. Preferably, the are about 6 pairs of pins 50 wherein the pins in the pair are disposed on opposite sides of the wood member's longitudinal axis. More preferably, the pins 50 are vent pins 52. A vent pin 52 is a hollow pin that is biased firmly against the wooden handle member 22. The mold 60 preferably includes passage(s) 64 therein with are in fluid communication with the vent pins 52. In this configuration, steam may pass from the wooden handle member 22 through the vent pins 52 and be exhausted via the passage 64. Thus the overmold 24 covers generally all of the wood member medial portion 28 and wherein the overmold outer surface 40 is generally smooth, generally uniform, or substantially smooth.

Preferably, the wood member 22 does not have a high moisture content prior to applying the overmold 24 thereto. Thus, the step of providing 100 an elongated wood member 22 shaped for use as a tool handle preferably includes the step of providing 110 a wood member 22 with a moisture content of below about 10%. More preferably, the step of providing 110 a wood member with a moisture content of below about 10% includes the steps of kiln drying 112 the wood member 22 until the moisture content is between about 12% and 15%, and, air drying 114 the wood member 22 until the moisture content is below about 10% but above about 8%. Further, as detailed above, it is desirable for the wood member second end 30 to have a bore hole 36. Thus, the step of providing 100 an elongated wood member 22 shaped for use as a tool handle preferably includes the step of providing 116 a wood member 22 with a bore hole 36 in the second end 30.

The step of injecting 104 a molten material into the mold cavity 60 to apply the material to the wood member medial portion 28 and second end 30 includes the steps of applying 120 the material in a molten state, allowing 122 the material to cool until the material is substantially rigid, and removing 124 the wood member from the mold 60. When the molten material, which is preferably polypropylene at a temperature between about 425 and 450, is injected 104 into the mold 60, the molten material is applied to the wood member medial portion 28 and second end 30. The heat imparted to the wood member 22 is sufficient to cause the residual moisture in the wood member 22 to be converted to steam. After application and cooling of the molten material, the wood member 22 has a moisture content of between about 8% and 10%, and more preferably about 10%. As noted above, the step of applying 120 the material in a molten state includes the step of applying 121 a layer of molten material that is between about 0.1 inch and 0.2 inch thick, and more preferably about 0.125 inch thick.

As noted above, the steam is vented from the wood member 22 and generally seeks the path of least resistance. That is, as the wood member medial portion 28 and second end 30, except for the bore hole 36, are covered in the molten material, the path of least resistance is through the wood member first end 26 and the bore hole 36. Further, to ensure that the wood member 22 is not completely encased by the molten material, the step of applying 120 the material in a molten state includes the step of preventing 128 the molten material from contacting the wooden member first end 26.

The handle assembly 20 may be coupled to a tool head 14 in order to form a tool 10. That is, the method may include the further steps of providing 130 a coupling device 16, providing 132 a tool head 14 having an eye 18, said eye shaped to correspond to the wooden member first end 26, inserting 134 the wood member first end 26 into the tool head eye 18, and, fixing 136 the wood member first end to the tool head with the coupling device 16. As noted above, it is preferable to have a mechanical coupling, thus the step of providing 130 a coupling device may include the steps of providing 140 a wedge 19, and inserting 142 said wedge into the wood member first end 26.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of producing a tool comprising:
   providing an elongated wood member shaped for use as a tool handle, said wood member having a first end, a medial portion and a second end;
   placing said wood member into an injection mold cavity; and
   injecting a molten material into said mold cavity to apply said material to said wood member medial portion and second end;
   wherein said step of injecting a molten material into said mold cavity to apply said material to said wood member medial portion and second end includes the steps of:
   applying the material in a molten state,
   allowing said material to cool until said material is substantially rigid, and
   removing said wood member from said mold; and
   wherein said steps of providing an elongated wood member and applying the material in a molten state includes the steps of:

providing a wood member with a bore hole in said second end, preventing said molten material from contacting said wooden member first end, and wherein steam created from moisture in said wooden member during said step of applying the material in a molten state is vented from said wooden member via one of said first end or said bore hole.

2. The method of claim 1 wherein said step of providing an elongated wood member includes the step of:

providing a wood member with a moisture content of below about 10%.

3. The method of claim 2 wherein said step of providing a wood member with a moisture content of below about 10% includes the steps of:

kiln drying said wood member until the moisture content is between about 12% and 15%; and air drying said wood member until the moisture content is below about 10%.

4. The method of claim 1 wherein said step of applying the material in a molten state includes the step of:

applying a layer of molten material that is between about 0.1 inch and 0.2 inch.

5. The method of claim 4 wherein said step of applying the material in a molten state includes the step of:

applying a layer of molten material having a thickness of about 0.125 inch.

6. The method of claim 1 further comprising:

providing a coupling device;

providing a tool head having an eye, said eye shaped to correspond to said wooden member first end;

inserting said wood member first end into said tool head eye; and fixing said wood member first end to said tool head with said coupling device.

7. The method of claim 6 wherein said steps of providing a coupling device and fixing said wood member first end to said tool head include the steps of:

Providing a wedge; and

Inserting said wedge into said wood member first end.

8. The method of claim 1 further comprising placing said wood member into the injection mold cavity such that the bore hole is not enclosed in the injection mold cavity.

9. The method of claim 8 further comprising venting steam from the bore hole during said step of applying the material in the molten state to the wood member.

10. The method of claim 9 further comprising inserting a hollow tube into the bore hole to vent the steam.

11. The method of claim 10 further comprising:

removing the hollow tube from the bore hole; and expanding the molten material at least partially into the bore hole.

12. The method of claim 1 further comprising placing said wood member into the injection mold cavity such that the first end is not enclosed in the injection mold cavity.

13. The method of claim 12 further comprising venting steam from the first end during said step of applying the material in the molten state to the wood member.

14. The method of claim 1 further comprising providing the bore hole in an end face of the second end.

15. The method of claim 1 further comprising providing the bore hole parallel to a longitudinal axis of the wood member.

16. The method of claim 1 further comprising injecting the molten material as molten polypropylene.

17. The method of claim 1 further comprising supporting the wood member by a plurality of pins in the injection mold cavity.

18. The method of claim 17 further comprising venting steam through a hollow pin of the plurality of pins during said step of applying the material in the molten state to the wood member.

19. The method of claim 18 further comprising:

removing the plurality of pins; and expanding the molten material into vent openings from the plurality of pins.

* * * * *